(12) United States Patent
Shin et al.

(10) Patent No.: US 10,374,547 B2
(45) Date of Patent: Aug. 6, 2019

(54) AGGREGATION MANAGEMENT APPARATUS AND AGGREGATION MANAGEMENT METHOD

(71) Applicant: KABUSHIKI KAISHA TOSHIBA, Tokyo (JP)

(72) Inventors: Hiromasa Shin, Kanagawa (JP); Mitsuru Kakimoto, Kanagawa (JP); Yusuke Endoh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 15/264,047

(22) Filed: Sep. 13, 2016

(65) Prior Publication Data

US 2017/0077870 A1    Mar. 16, 2017

(30) Foreign Application Priority Data

Sep. 14, 2015  (JP) .................................. 2015-181197

(51) Int. Cl.
*H02S 50/10* (2014.01)
*G06Q 50/06* (2012.01)
*H02S 50/00* (2014.01)

(52) U.S. Cl.
CPC ............. *H02S 50/10* (2014.12); *G06Q 50/06* (2013.01); *H02S 50/00* (2013.01)

(58) Field of Classification Search
CPC .......... H02S 50/10; G06Q 50/06; Y04S 10/54
See application file for complete search history.

(56) References Cited

U.S. PATENT DOCUMENTS

| 8,682,585 | B1* | 3/2014 | Hoff | ........................ H02S 50/10 |
| | | | | 702/3 |
| 9,880,230 | B1* | 1/2018 | Hoff | ........................ H02S 50/00 |
| 2008/0294472 | A1* | 11/2008 | Yamada | ................. G06Q 30/02 |
| | | | | 705/7.35 |
| 2011/0276269 | A1* | 11/2011 | Hummel | ................. H02J 3/383 |
| | | | | 702/3 |
| 2012/0323382 | A1* | 12/2012 | Kamel | ...................... G05F 1/66 |
| | | | | 700/286 |
| 2013/0067253 | A1* | 3/2013 | Tsuda | ..................... B60L 8/003 |
| | | | | 713/300 |

(Continued)

FOREIGN PATENT DOCUMENTS

| JP | 2003-259551 A | 9/2003 |
| JP | 2007-4646 | 1/2007 |

(Continued)

*Primary Examiner* — Tung X Nguyen
*Assistant Examiner* — Dominic E Hawkins
(74) *Attorney, Agent, or Firm* — Finnegan, Henderson, Farabow, Garrett & Dunner, L.L.P.

(57) ABSTRACT

According to one embodiment, an aggregation management apparatus includes processing circuitry configured to acquire position information and performance information of each photovoltaic power generation facility in a set of photovoltaic power generation facilities from a storage; and calculate an evaluation value of a predictive error of a total generated energy of the set of photovoltaic power generation facilities, based on the position information, the performance information, and a correlation level of the predictive errors of solar radiation information depending on a distance between two locations.

18 Claims, 8 Drawing Sheets

(56) References Cited

U.S. PATENT DOCUMENTS

| | | | | |
|---|---|---|---|---|
| 2013/0085885 A1* | 4/2013 | Sahai | ............... | G06Q 50/06 |
| | | | | 705/26.4 |
| 2014/0136131 A1* | 5/2014 | Fujimori | ............ | H02S 50/10 |
| | | | | 702/60 |
| 2014/0252855 A1* | 9/2014 | Watanabe | ............ | H02J 3/00 |
| | | | | 307/31 |
| 2015/0073737 A1* | 3/2015 | Inuzuka | ............ | H02S 50/10 |
| | | | | 702/61 |
| 2015/0277437 A1* | 10/2015 | Kitagawa | ............ | G06Q 50/06 |
| | | | | 700/291 |

FOREIGN PATENT DOCUMENTS

| | | |
|---|---|---|
| JP | 2008-77369 | 4/2008 |
| JP | 2013-161239 | 8/2013 |
| JP | 2013-246746 | 12/2013 |
| JP | 2014-54048 | 3/2014 |
| JP | 2015-52848 A | 3/2015 |
| JP | 2016-35719 | 3/2016 |
| JP | 2016-62191 | 4/2016 |
| WO | WO 2011/092882 | 8/2011 |

\* cited by examiner

AGGREGATION MANAGEMENT APPARATUS AND AGGREGATION MANAGEMENT METHOD

CROSS-REFERENCE TO RELATED APPLICATIONS

This application is based upon and claims the benefit of priority from Japanese Patent Application No. 2015-181197, filed on Sep. 14, 2015; the entire contents of which are incorporated herein by reference.

FIELD

Embodiments described herein relates to an aggregation management apparatus and an aggregation management method.

BACKGROUND

In recent years, there has been schemed an aggregation business of aggregating electric power generated by a plurality of photovoltaic power generation facilities and supplying the power to consumers. An aggregation operator or aggregation entrepreneur (below, it is called aggregator) needs to evaluate the photovoltaic power generation plant with which the aggregator makes a contract for buying the power in order to increase profitability of the aggregation business. There has been conventionally proposed a method of evaluating the photovoltaic power generation plant on the basis of an amount of solar radiation in the photovoltaic power generation plant depending on weather data in the past and a facility capacity of the photovoltaic power generation plant.

It is essential for increasing profitability of the aggregation business not only to increase total generated energies to be aggregated but also to enhance utilization of predicting the total generated energy, i.e., to reduce a predictive error of the total generated energy. This is because when an error occurs in the total generated energy actually supplied by the aggregator against, e.g., a power generation schedule presented (or submitted) beforehand by the aggregator, it involves paying settlement money, resulting in a drop in profitability.

Accordingly, in the evaluation of the photovoltaic power generation plant, it requires to evaluate a generated energy of the photovoltaic power generation plant and also evaluate a predictive error of the total generated energy in case that the aggregator makes the contract with the photovoltaic power generation plant. However, it is difficult for the conventional evaluation method to evaluate the predictive error of the total generated energy.

DETAILED DESCRIPTION

According to one embodiment, an aggregation management apparatus includes processing circuitry configured to acquire position information and performance information of each photovoltaic power generation facility in a set of photovoltaic power generation facilities; and calculate an evaluation value of a predictive error of a total generated energy of the set of photovoltaic power generation facilities, based on the position information, the performance information, and a correlation level of the predictive errors of solar radiation information depending on a distance between two locations.

Embodiments of the present invention will hereinafter be described with reference to the drawings.

First Embodiment

An aggregation management apparatus (which will hereinafter be simply termed the "management apparatus) according to a first embodiment will be described with reference to FIGS. 1-8. The management apparatus according to the first embodiment is utilized by an aggregator and other equivalent operators who conduct aggregation businesses for photovoltaic power generation (PV). The management apparatus assesses a buying price when purchasing electric power from a photovoltaic power generation facility (PV facility) possessed by a photovoltaic power generation operator (PV operator). In the following discussion, an assessed target PV operator and an assessed target PV facility will be referred to as a target PV operator and a target PV facility.

The management apparatus evaluates a predictive error of a total generated energy produced by the PV facility. The PV facility is exemplified by a photovoltaic power generation panel for household use and a photovoltaic power generation plant. However, the PV facility is not limited to these exemplifications.

Figure 1:
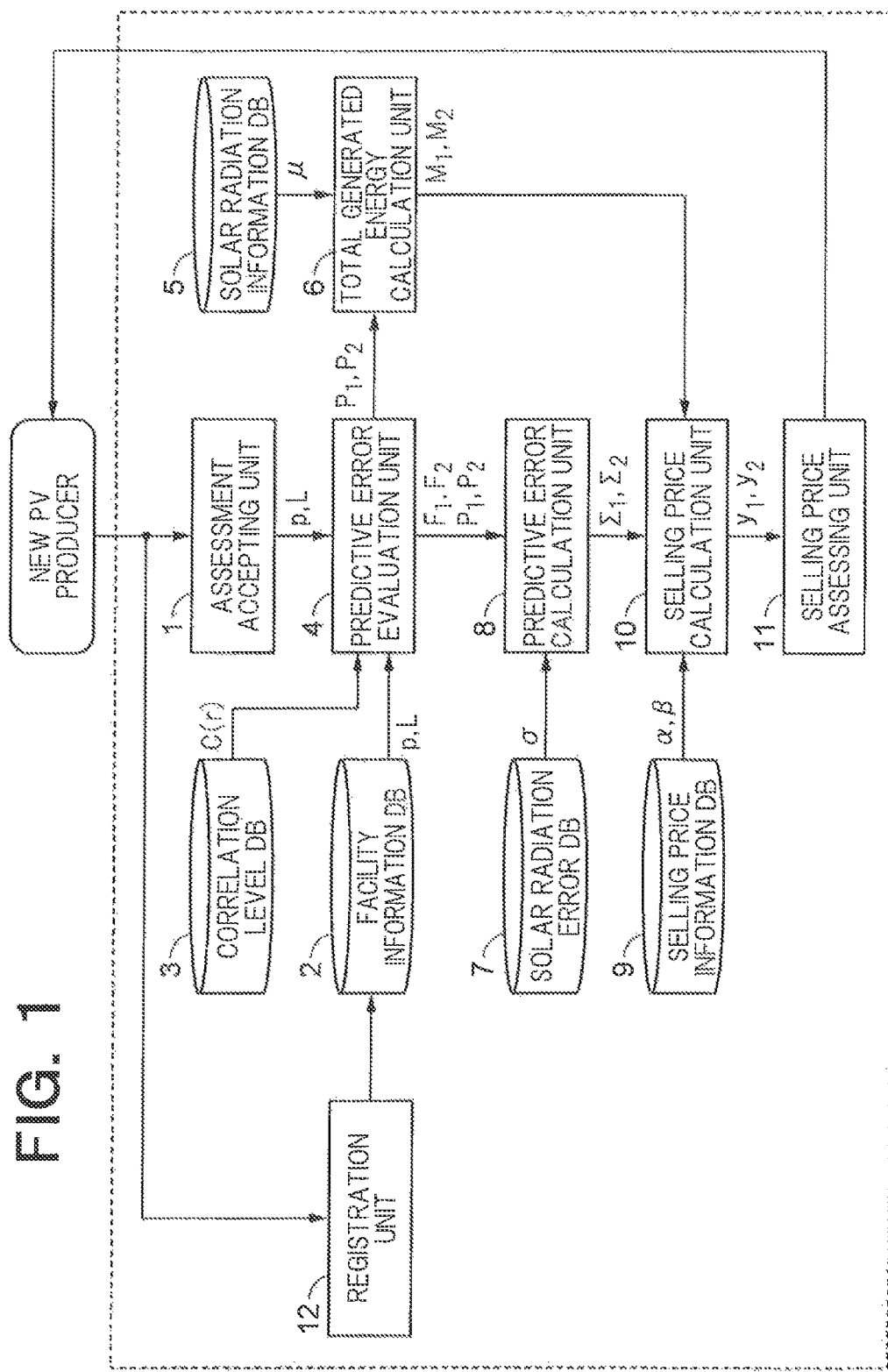
FIG. 1 is a diagram illustrating one example of a functional configuration of an aggregation management apparatus according to a first embodiment.

FIG. 1 is a diagram illustrating one example of a functional configuration of the management apparatus according to the first embodiment. As illustrated in FIG. 1, the management apparatus includes an assessment accepting unit 1, a facility information database (DB) 2, a correlation level database 3, a predictive error evaluation unit 4, a solar radiation information DB 5, a total generated energy calculation unit 6, a solar radiation error DB 7, a predictive error calculation unit 8, a selling price information DB 9, a selling price calculation unit 10, a selling price assessing unit 11, and a registration unit 12.

The assessment accepting unit 1 accepts a request for assessing the buying price of the PV facility from a new PV producer. The new PV producer is a PV producer having a PV facility not yet registered as a power aggregated target facility. The first embodiment assumes that the new PV producer inputs the assessment request to the management apparatus in order to make a request for assessing the buying price of the power. In other words, according to the first embodiment, the target PV producer is the new PV producer, and the target PV facility is the PV facility not yet registered. The assessment accepting unit 1, upon accepting the assessment request from the new PV producer, acquires facility information of the unregistered PV facility of which the assessment of the buying price is requested.

The facility information is information related to the PV facility possessed by the PV producer. The facility information contains position information L and performance information p.

The position information L represents information indicating a position in which the PV facility is installed. The position information L is exemplified by a latitude, a longitude and an address. However, the position information L is not limited to these examples.

The performance information p represents information indicating performance of the PV facility. The performance information p is exemplified by a system output coefficient, a rated system output, a maximum output and an executing conversion efficiency of the PV facility. However, the performance information p is not limited to examples. A plurality of parameters described above may also be stored as the performance information p. The following discussion will be made by exemplifying a case in which the performance information p is the rated system output.

The facility information DB 2 stores the facility information of the PV facility of a registered PV producer. The registered PV producer is a PV producer having the PV facility registered as the power aggregated target facility. The facility information DB 2 stores the facility information of one or a plurality of PV facilities.

The correlation level DB 3 stores a correlation level $C(r)$ of solar radiation errors a between two locations, depending on a distance r between the two locations. The solar radiation information herein indicates a solar irradiance or an amount of solar radiation. The solar radiation error σ represents an error between an observed value and a predictive value of the solar radiation information. The correlation level $C(r)$ is expressed by, e.g., a correlation coefficient. In the following discussion, the correlation level $C(r)$ is deemed to be the correlation coefficient. A relationship between the distance r and the correlation level $C(r)$ of solar radiation errors a will hereinafter be described.

Generally, a meteorological feature has a spatial continuousness. Therefore, the meteorological features at the two locations at a close distance r exhibit a similar tendency. The same is applied to the solar radiation error σ. At the two locations at the close distance r, such a probability increases that when the solar radiation error σ at one location becomes plus (or minus), the solar radiation error σ at the other location also becomes plus (or minus). In other words, as the distance r between the two locations becomes closer, correlation of the solar radiation errors a between the two locations becomes stronger or larger (the correlation level $C(r)$ becomes higher). As the distance r between the two locations becomes long, the correlation of the solar radiation errors a between the two locations becomes weaker or smaller (the correlation level $C(r)$ becomes lower).

Figure 2:
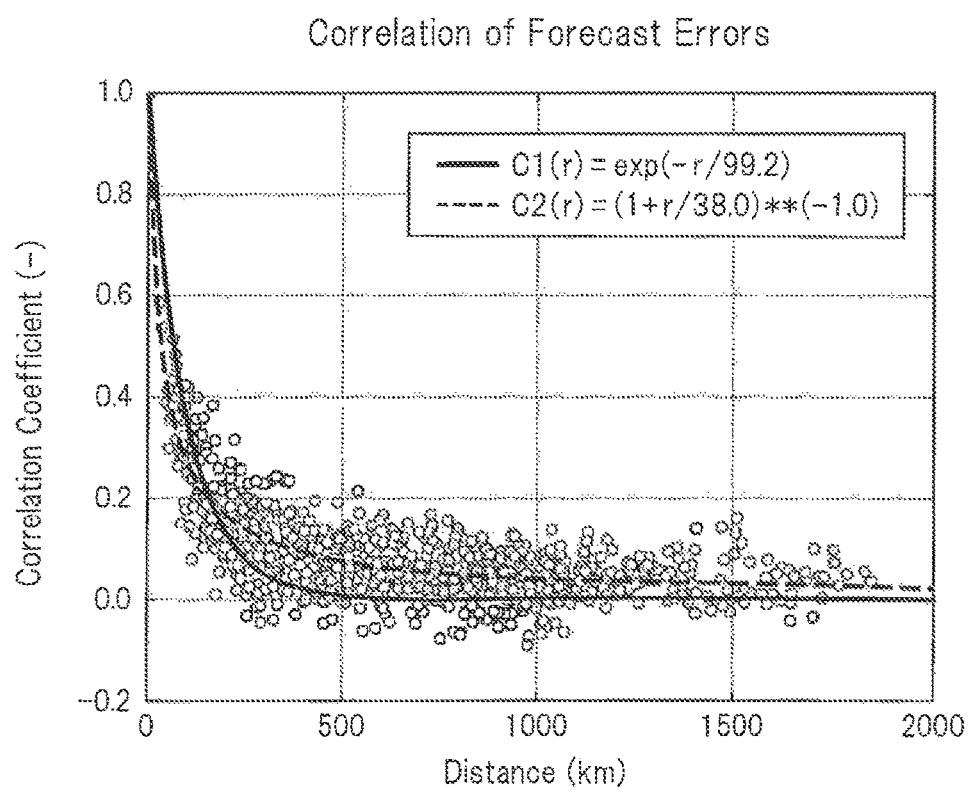
FIG. 2 is a graph illustrating a concrete example of a relationship between a distance of two locations and a correlation level of solar radiation errors of solar irradiance.

Herein, FIG. 2 is a graph depicting a concrete example of a relationship between the distance r between the two locations and the correlation level $C(r)$ of the solar radiation errors a of the solar irradiance. In FIG. 2, the axis of abscissa indicates the distance r between the two locations, and the axis of ordinate indicates the correlation level (correlation coefficient) $C(r)$ of the solar radiation errors a of the solar irradiance at the two locations. FIG. 2 is created based on data of the observed values and the predictive values of the solar irradiance, which are provided by meteorological offices located nationwidely at 41 locations, and is a plotted graph of the correlation levels $C(r)$ of combinations of the whole meteorological offices at the 41 locations. A difference between the observed value and the predictive value of the solar irradiance corresponds to the solar radiation error σ of the solar irradiance. Such a tendency can be confirmed from FIG. 2 that as the distance r between the two locations becomes long, the correlation level $C(r)$ of the solar radiation errors a of the solar irradiance at the two locations becomes smaller.

The foregoing relationship between the distance r and the correlation level $C(r)$ can be also modeled based on an exponential function and a power function. A correlation model $C_1(r)$ is obtained by modeling the correlation level $C(r)$ based on the exponential function. A correlation model $C_2(r)$ is obtained by modeling the correlation level $C(r)$ based on the power function. The correlation models $C_1(r)$ and $C_2(r)$ are expressed respectively by the following formulae.

[Mathematical Expression 1]

$$C_1(r) = \exp(-r/r_0) \quad (1)$$

$$C_2(r) = (1 + r/r_0)^{-n} \quad (2)$$

In the formulae (1) and (2), $r_0$ is an attenuation distance, and n is a power exponent. In the example of FIG. 2, the attenuation distance $r_0$ of the correlation model $C_1(r)$ is 99.2, and the attenuation distance $r_0$ of the correlation model $C_2(r)$ is 38.0.

As described above, the correlation level $C(r)$ depending on the distance r is obtained by modeling the observed values and the predictive values of the solar radiation information. These observed values and predictive values can be acquired from weather prediction services of public offices and private companies. The correlation level DB 3 stores the thus acquired correlation level $C(r)$. To be specific, the correlation level DB 3 may store the correlation level $C(r)$ per distance r, and may also store the parameters ($r_0$, n) of the correlation model $C_1(r)$, $C_2(r)$ obtained by modeling the relationships between the distances r and the correlation levels $C(r)$.

The predictive error evaluation unit 4 calculates an evaluation value F of a predictive error Σ of a total generated energy M of the set of PV facilities, based on the position information L and the performance information p of each PV facility included in the set of PV facilities, and the correlation level $C(r)$ of the solar radiation errors a depending on the distance r between the two locations.

The set of PV facilities is a set of one or the plurality of PV facilities which each is defined as the target facility on which the predictive error evaluation unit 4 calculates the evaluation value F. The total generated energy M of the set of PV facilities is a total value of generated energies of the respective PV facilities included in the set of PV facilities.

The evaluation value F is a value for evaluating the predictive error Σ (i.e., a degree of easiness of predicting the total generated energy M) of the total generated energy M. The evaluation value F becomes larger (or smaller) as the predictive error Σ of the total generated energy M becomes larger (i.e., the total generated energy M is harder to be predicted), but becomes smaller (or larger) as the predictive error $\Sigma$ of the total generated energy M becomes smaller (i.e., the total generated energy M is easier to be predicted). The evaluation value F is calculated by, e.g., the following formulae.

[Mathematical Expression 2]

$$F^2 = \Sigma_{i,j} w_i w_j C(r_{i,j}) \quad (3)$$

$$w_i = p_i/P \quad (4)$$

$$P = \Sigma_j p_j \quad (5)$$

In the formulae (3)-(5), $p_i$ is performance information (a system output coefficient) of a PV facility j included in the set of PV facilities, P is performance information (a system output coefficient of the set of whole PV facilities) of the set of PV facilities, $w_i$ is a weighting coefficient of each PV facility i included in the set of PV facilities, and $C(r_{i,j})$ is a correlation level of the solar radiation errors a depending on a distance $r_{i,j}$ between the PV facility i and the PV facility j included in the set of PV facilities. The distance $r_{i,j}$ is calculated from position information $L_i$ of the PV facility i and the position information $L_j$ of the PV facility j.

The evaluation value F corresponds to a standard deviation of the correlation levels $C(r)$ between the respective PV facilities included in the set of PV facilities, and is a dimensionless constant that is equal to or larger than 0 but equal to or smaller than 1. As understood from the formula (3), this evaluation value F becomes larger as the correlation level $C(r)$ is larger but becomes smaller as the correlation level $C(r)$ is smaller. The correlation level $C(r)$ also becomes smaller as the distance between the PV facilities is long but becomes larger (i.e., remoter) as the distance between the PV facilities is short (i.e., closer). Further, the meteorological features at the two locations at the close distance exhibit the similar tendency. Hence, the predictive error $\Sigma$ of the total generated energy M becomes larger as the distance between the respective PV facilities included in the set of PV facilities is short; and the predictive error $\Sigma$ of the total generated energy M becomes smaller as the distance between the respective PV facilities included in the set of PV facilities is long.

Accordingly, the evaluation value F becomes larger as the predictive error $\Sigma$ of the total generated energy M is larger, and becomes smaller as the predictive error $\Sigma$ of the total generated energy M is smaller. This means that the total generated energy M of the set of PV facilities is easier to be predicted as the evaluation value F is smaller.

The predictive error evaluation unit 4 calculates such an evaluation value F with respect to the set of PV facilities. Note that the description will be hereinafter made by exemplifying a case of calculating the evaluation value F by the formula (3); however, the evaluation value F may also be a variance or an average value of the correlation levels $C(r)$ between the respective PV facilities included in the set of PV facilities.

In the first embodiment, the predictive error evaluation unit 4 calculates an evaluation value $F_1$ (a first evaluation value) and an evaluation value $F_2$ (a second evaluation value).

The evaluation value $F_1$ is an evaluation value of a set of new PV facilities. The set of new PV facilities is the set of PV facilities including the registered PV facility and the unregistered PV facility (the target PV facility). The predictive error evaluation unit 4 calculates performance information $P_1$ and a weighting coefficient $w_1$ of the set of new PV facilities, based on the pieces of performance information p of the unregistered PV facility and the registered PV facility. The predictive error evaluation unit 4 calculates the evaluation value $F_1$, based on the calculated performance information $P_1$ and weighting coefficient $w_1$, the pieces of position information L of the unregistered PV facility and the registered PV facility, and the correlation level $C(r)$ stored in the correlation level DB 3.

The evaluation value $F_2$ is an evaluation value of the set of current PV facilities. The set of current PV facilities is the set of PV facilities including the registered PV facility but not including the unregistered PV facility (the target PV facility). The predictive error evaluation unit 4 calculates performance information $P_2$ and weighting coefficient $w_2$ of the set of current PV facilities, based on the performance information p of the registered PV facility. The predictive error evaluation unit 4 calculates the evaluation value $F_2$, based on the calculated performance information $P_2$ and weighting coefficient $w_2$, the position information L of the registered PV facility, and the correlation level $C(r)$ stored in the correlation level DB 3.

The solar radiation information DB 5 stores solar radiation information μ at an Interval of a predetermined period (one hour, one day, one week, one month) in an area covering at least part of the set of PV facilities. The solar radiation information μ is defined as an observed value of the solar radiation information in the area, and can be acquired from the weather prediction services of the public offices and the private companies. The solar radiation information μ is exemplified by an average value of the solar irradiances (a slope solar irradiance, an array solar irradiance, a direct solar irradiance, a scattered solar irradiance, and an all-weather solar irradiance) during a predetermined period, and an amount of solar radiation (an amount of slope solar radiation, an amount of array solar radiation, an amount of direct solar radiation, an amount of scattered solar radiation, and an amount of all-weather solar radiation) during a predetermined period. However, the solar radiation information μ is not limited to these examples. When the set of PV facilities is placed so as to cover a plurality of areas, the solar radiation information DB 5 may store the solar radiation information μ on an area-by-area basis.

Figure 3:
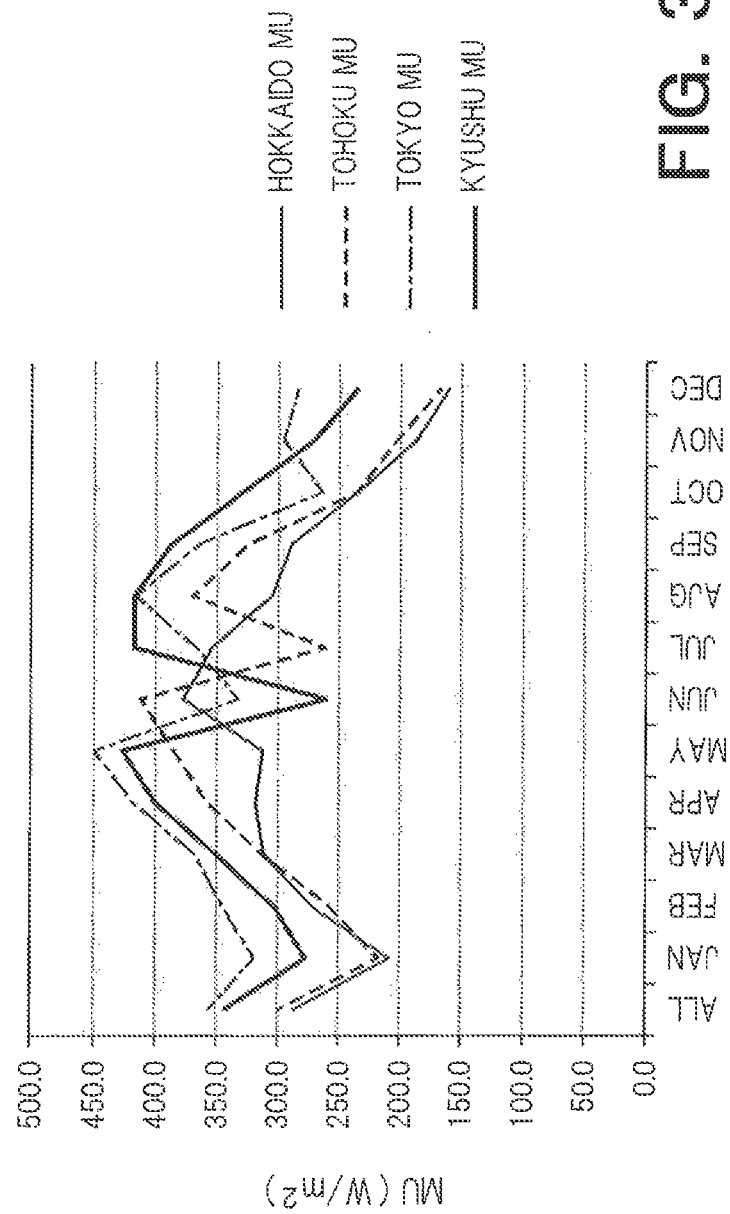
FIG. 3 is a diagram illustrating one example of solar radiation information stored in a solar radiation information database (DB)

FIG. 3 is a diagram illustrating one example of the solar radiation information μ stored in the solar radiation DB 5. In the example of FIG. 3, the solar radiation information μ Indicates average values of the solar irradiances per month and all the year through (ALL) in January through December in four areas, i.e., HOKKAIDO, TOUHOKU, TOKYO and KYUSHU. According to FIG. 3, for example, the average value of the solar irradiances of HOKKAIDO in January is 207.2 W/m².

The total generated energy calculation unit 6 calculates the total generated energy M (Wh/m²) of the set of PV facilities, based on the performance information p of the set of PV facilities and the solar radiation information μ. The total generated energy M is calculated per period of the solar radiation information μ. For example, when the solar radiation information μ per month is stored in the solar radiation information DB 5, the total generated energy calculation unit 6 calculates the total generated energy M per month. When one area covers the set of PV facilities, the total generated energy M is calculated by the following formula.

[Mathematical Expression 3]

$$M \cong P\mu \quad (6)$$

Note that a coefficient for adjusting a unit is omitted in the formula (6). When the solar radiation information $\mu$ is the amount of solar radiation, the total generated energy M is calculated by the formula (6). By contrast, when the solar radiation information $\mu$ is the solar irradiance, the total generated energy M is calculated by multiplying a right side of the formula (6) by a period of the solar irradiance.

In case that a plurality, of areas covers the set of PV facilities, and the solar radiation information $\mu$ of each area is stored in the solar radiation information DB 5, the total generated energy calculation unit 6 may calculate the generated energy of the respective PV facilities in the set of PV facilities on the basis of the performance information p of the respective PV facilities and the solar radiation information $\mu$ of the areas covering the respective PV facilities, and also calculate the total generated energy M by totalizing the generated energies of the respective PV facilities.

In the first embodiment, the total generated energy calculation unit 6 calculates a total generated energy $M_1$ (a first total generated energy) and a total generated energy $M_2$ (as second total generated energy).

The total generated energy $M_1$ is a total generated energy of the set of new PV facilities. The total generated energy calculation unit 6 calculates the total generated energy $M_1$, based on the performance information $P_1$ of the set of new PV facilities and the solar radiation information $\mu$ stored in the solar radiation information DB 5.

The total generated energy $M_2$ is a total generated energy of the set of current PV facilities. The total generated energy calculation unit 6 calculates the total generated energy $M_2$, based on the performance information $P_2$ of the set of current PV facilities and the solar radiation information $\mu$ stored in the solar radiation information DB 5.

The solar radiation error DB 7 stores the solar radiation error $\sigma$ at the interval of the predetermined period (one hour, one day, one week, one month) in the area covering at least part of the set of PV facilities. The solar radiation error $\sigma$ corresponds to a difference between the observed value and the predicted value of the solar radiation information in the area. The solar radiation error $\sigma$ may also be a simple difference between the observed value and the predicted value, may further be a mean absolute error (MAE), and may still further be a root mean square error (RMSE). The observed value and the predicted value of the solar radiation information can be acquired from the weather prediction services of the public offices and the private companies.

The solar radiation error $\sigma$ is exemplified by a predictive error of the average value of the solar irradiances (the slope solar irradiance, the array solar irradiance, the direct solar irradiance, the scattered solar irradiance, and the all-weather solar irradiance) during the predetermined period, and a predictive error of the amount of solar radiation (the amount of slope solar radiation, the amount of array solar radiation, the amount of direct solar radiation, the amount of scattered solar radiation, and the amount of all-weather solar radiation) during a predetermined period; however, the solar radiation error $\sigma$ is not limited to these examples. When the set of PV facilities is placed so as to cover the plurality of areas, the solar radiation error DB 7 may store the solar radiation error $\sigma$ on the area-by-area basis.

Figure 4:
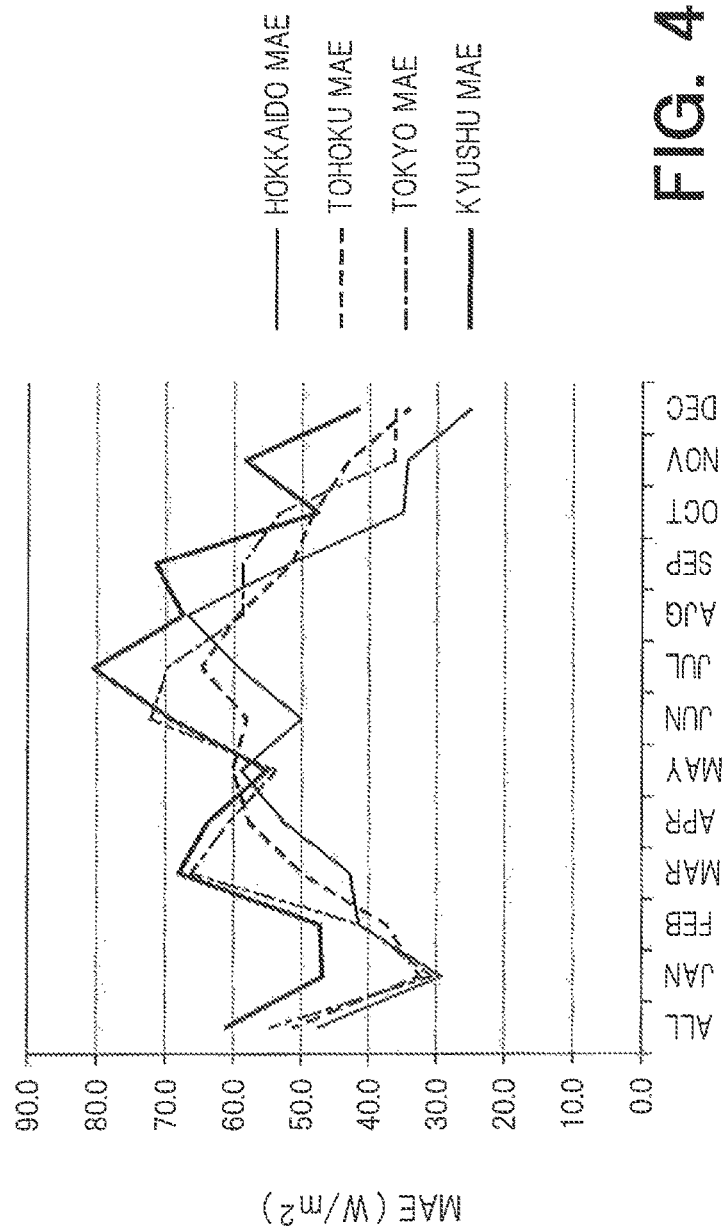
FIG. 4 is a diagram illustrating another example of the solar radiation information stored in the solar radiation information DB.
Figure 5:
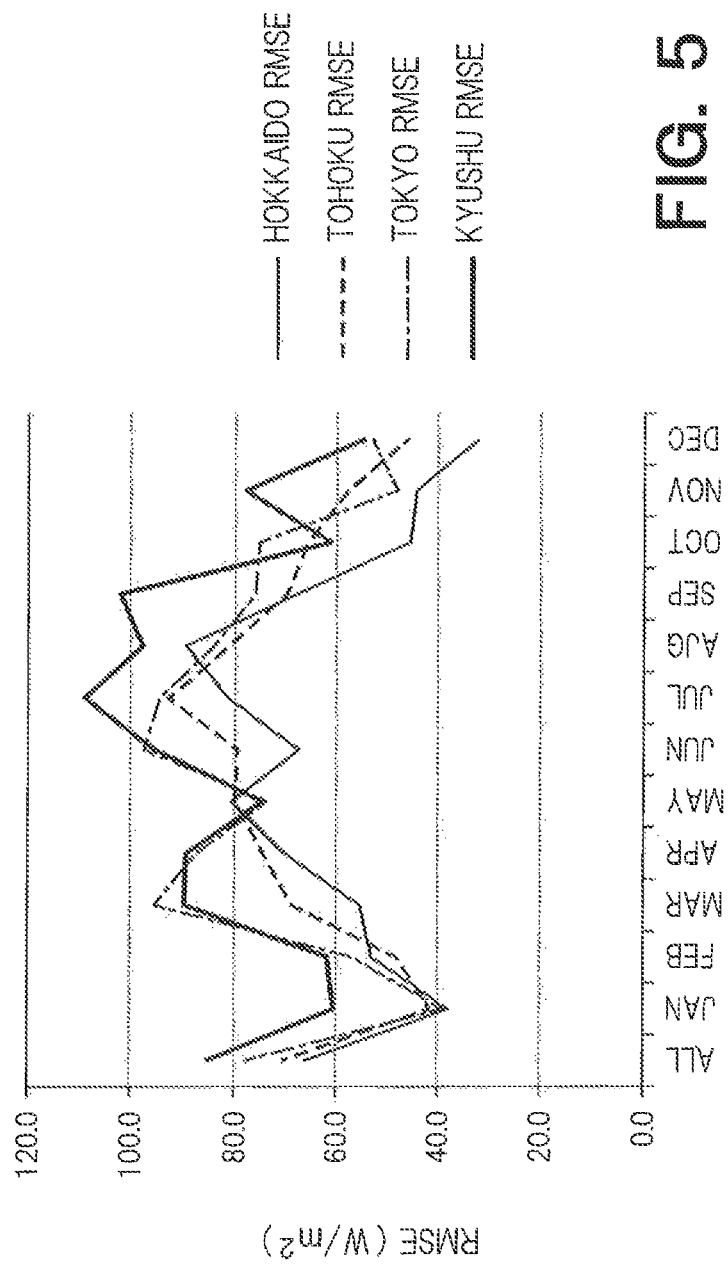
FIG. 5 is a diagram illustrating still another example of the solar radiation information stored in the solar radiation information DB.

FIGS. 4 and 5 are diagrams each depicting one example of the solar radiation error $\sigma$ stored in the solar radiation error DB 7. In the examples of FIGS. 4 and 5, the solar radiation error $\sigma$ Indicates the predictive errors of the average values of the solar irradiances per month and all the year through (ALL) in January through December in the four areas, i.e., HOKKAIDO, TOUHOKU, TOKYO and KYUSHU.

In the example of FIG. 4, the solar radiation error $\sigma$ is the MAE between the observed value and the predicted value. According to FIG. 4, for instance, the solar radiation error $\sigma$ of the solar irradiance of HOKKAIDO in January is 29.4 W/m$^2$. This error corresponds to an error of about 3% by using the solar irradiance (1000 W/m$^2$) as a standard under the standard test condition (STC).

In the example of FIG. 5, the solar radiation error $\sigma$ Is the RMAE between the observed value and the predicted value. According to FIG. 5, for example, the solar radiation error $\sigma$ of the solar irradiance of HOKKAIDO in January is 37.9 W/m$^2$. This error corresponds to an error of about 4% by using the solar irradiance (1000 W/m$^2$) as the standard under the STC.

Note that the solar radiation error DB 7 may store, as the solar radiation error $\alpha$, a rate to the predetermined solar radiation information serving as a standard. The solar radiation information serving as the standard may be the solar radiation information under the STC described above, and may also be the observed value of the solar radiation information as illustrated in FIG. 3.

The predictive error calculation unit 8 calculates a predictive error $\Sigma$ (Wh/m$^2$) of the total generated energy M on the basis of the evaluation value F of the set of PV facilities, the performance information P of the set of PV facilities and the solar radiation error $\sigma$ of the area covering at least part of the set of PV facilities. The predictive error $\Sigma$ is calculated by, e.g., the following formula.

[Mathematical Expression 4]

$$\Sigma \cong P\sigma F \quad (7)$$

The predictive error $\Sigma$ in the formula (7) corresponds to a standard deviation of the predictive error of the total generated energy M. Note that a coefficient for adjusting a unit is omitted in the formula (7). When the solar radiation error $\sigma$ is the predictive error of the amount of solar radiation, the predictive error $\Sigma$ of the total generated energy M is calculated by the formula (7). By contrast, when the solar radiation error $\sigma$ is the predictive error of the solar irradiance, the predictive error $\Sigma$ of the total generated energy M is calculated by multiplying a right side of the formula (7) by the period of the solar irradiance.

In the first embodiment, the predictive error calculation unit 8 calculates a predictive error $\Sigma_1$ (a first predictive error) and a predictive error $\Sigma_2$ (a second predictive error).

The predictive error $\Sigma_1$ is a predictive error of the set of new PV facilities. The predictive error calculation unit 8 calculates the predictive error $\Sigma_1$, based on the evaluation value $F_1$, the performance information $P_1$ of the set of PV facilities and the solar radiation error $\sigma$ of the area covering at least part of the set of PV facilities.

The predictive error $\Sigma_2$ is a predictive error of the set of current PV facilities. The predictive error calculation unit 8 calculates the predictive error $\Sigma_2$, based on the evaluation value $F_2$, the performance information $P_2$ of the set of PV facilities and the solar radiation error $\sigma$ of the area covering at least part of the set of PV facilities.

The selling price information DB 9 stores selling price information. The selling price information is a parameter for calculating a selling price y (¥/kWh) on the occasion of selling the power generated by the set of PV facilities. The parameter is exemplified by an average value $\alpha$ (¥/kWh) of spot market prices and an average value $\beta$ (¥/kWh) of settlement prices upon occurrence of an Imbalance. However, the parameter is not limited to these examples.

The selling price information DB 9 may also store history information such as the spot market prices, the adjusted prices and actual selling prices. The foregoing parameter can be calculated from these items of history information.

The selling price calculation unit 10 calculates the selling price y (¥/kWh), based on the total generated energy M, the predictive error Σ of the total generated energy M, and the selling price information. The selling price y is calculated by, e.g., the following formula.

[Mathematical Expression 5]

$$y \cong \alpha - \beta \frac{\Sigma}{M\sqrt{2\pi}} = \alpha - \beta \frac{\sigma F}{\mu\sqrt{2\pi}} \quad (8)$$

In the formula (8), $2\pi^{1/2}$ is a constant for converting the standard deviation into an expected value of a one-sided error. As recognized from the formula (8), the selling price y can be expressed as a function of the evaluation value F. Hence, the selling price calculation unit 10 can also calculate the selling price y on the basis of the evaluation value F calculated by the predictive error evaluation unit 4. In this case, the management apparatus may not include the total generated energy calculation unit 6 and the predictive error calculation unit 8.

In the first embodiment, the selling price calculation unit 10 calculates a selling price $y_1$ (a first selling price) and a selling price $y_2$ (a second selling price).

The selling price $y_1$ is a selling price applied for the set of new PV facilities. The selling price calculation unit 10 calculates the selling price $y_1$, based on the predictive error $\Sigma_1$, the total generated energy $M_1$ and the pieces of selling price information α, β.

The selling price $y_2$ is a selling price applied for the set of current PV facilities. The selling price calculation unit 10 calculates the selling price $y_2$, based on the predictive error $\Sigma_2$, the total generated energy $M_2$ and the pieces of selling price information α, β.

Figure 6:
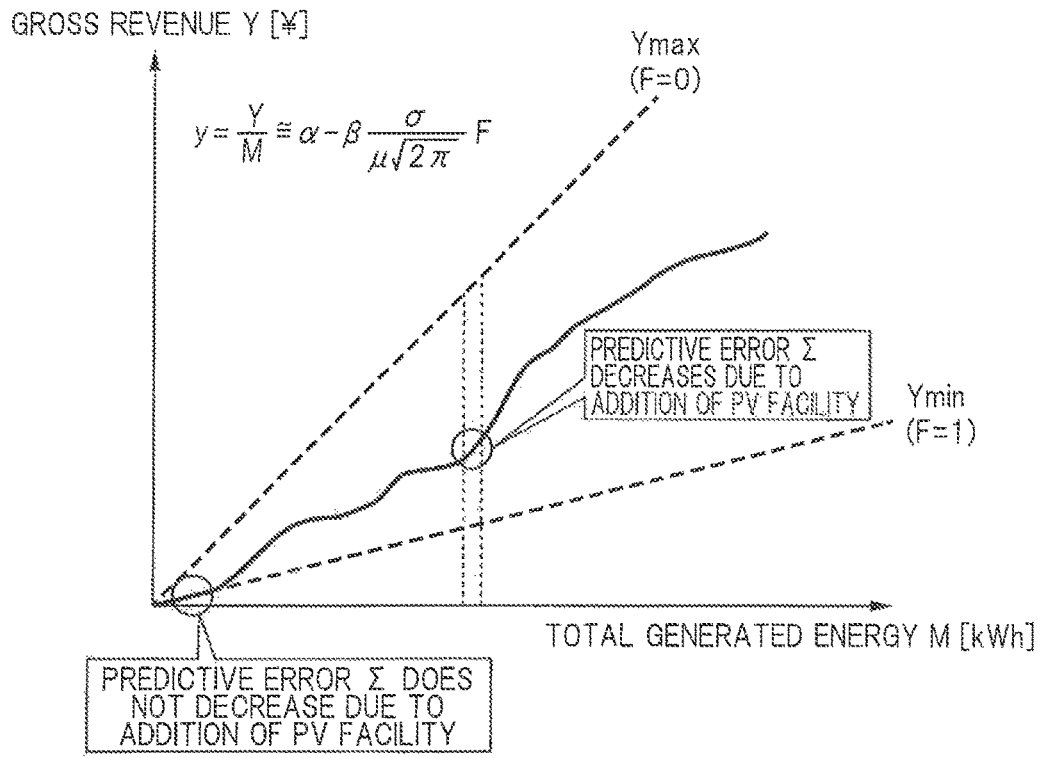
FIG. 6 is an explanatory graph illustrating a relationship between a total generated energy M and a selling price y.

The FIG. 6 is an explanatory graph illustrating a relationship between the total generated energy M and the selling price y. In FIG. 6, the axis of abscissa indicates a total generated energy M(kWh), the axis ordinate indicates a gross revenue Y(¥), and a solid line is a gross revenue curve illustrating a relationship between the total generated energy M and the gross revenue Y. The gross revenue Y is a sales figure in the case of selling the total generated energy M at the selling price y (¥/kWh). A broken line Ymax (F=0) indicates an upper bound of the gross revenue Y, and a broken line Ymin (F=1) indicates a lower bound of the gross revenue Y. The selling price y corresponds to a gradient of the gross revenue curve (y=Y/M). Therefore, Ymax is given by α×M, and Ymin is given by $(\alpha-\beta\times\sigma/\mu\times(2\pi)^{1/2})\times M$.

As illustrated in FIG. 6, when the predictive error Σ decreases by adding the new PV facility to the set of PV facilities and the gross revenue curve has a sharp gradient, this corresponds to an increase in selling price y. Further, when the predictive error Σ increases by adding the new PV facility to the set of PV facilities and the gross revenue curve has a gentle gradient, this corresponds to a drop in selling price y. It is to be noted that the gross revenue curve neither becomes smaller than the broken line Ymin nor becomes larger than the broken line Ymax.

The selling price assessing unit 11 assesses the selling price (¥/kWh) on the occasion of purchasing the power from the unregistered PV facility on the basis of the selling prices $y_1, y_2$ calculated by the selling price calculation unit 10. The selling price $y_1$ corresponds to a selling price of the set of PV facilities including the unregistered PV facility. The selling price $y_2$ corresponds to a selling price of the set of PV facilities not including the unregistered PV facility.

Accordingly, the selling price $y_1$ being higher (lower) than the selling price $y_2$ implies that the selling price increases (decreases) by purchasing the power from the unregistered PV facility. The increase (decrease) in selling price corresponds to the increase (decrease) in profitability of the aggregator.

Such being the case, the selling price assessing unit 11 assesses the selling price such that the selling prices applied when the selling price $y_1$ is higher than the selling price $y_2$ is higher that the selling price applied when the selling price $y_1$ is lower than the selling price $y_2$. As this assessment method, there is considered a method of, e.g., setting a reference selling price, then assessing the selling price of the unregistered PV facility higher than the reference selling price when the selling price $y_1$ is higher than the selling price $y_2$, and assessing the selling price of the unregistered PV facility lower than the reference selling price when the selling price $y_1$ is lower than the selling price $y_2$. A degree of how much the selling price is set high (or low) may be determined according to a difference between the selling price $y_1$ and the selling price $y_2$.

The selling price assessing unit 11, after assessing the selling price, presents the assessed selling price to a new PV producer having the unregistered PV facility. The new PV producer is thereby enabled to determine whether to sell the power to the aggregator (i.e., whether to register the unregistered PV facility) with reference to the presented selling price.

Note that the selling price information DB 9 stores the history information of the actual selling prices, and, when a current selling price corresponding to the selling price $y_2$ can be acquired from the history information, the selling price assessing unit 11 may compare the current selling price acquired from the history information with the selling price $y_1$ in order to assess the selling price. In this case, the management apparatus may not calculate the parameters (the evaluation value $F_2$, the performance information $P_2$, the total generated energy $M_2$, the predictive error $\Sigma_2$ and other equivalent parameters) for calculating the selling price $y_2$.

The registration unit 12 registers the unregistered PV facility possessed by the new PV producer as a power aggregated target facility in response to a registration request given from the new PV producer. The first embodiment assumes that the new PV producer having consented to the assessment of the presented selling price inputs the registration request of the assessed PV facility. The registration unit 12 accepts the registration request and facility information inputted from the new PV producer. The registration unit 12 stores the acquired facility information of the unregistered PV facility in the facility information DB 2. The unregistered PV facility is thereby registered as the aggregated target facility.

Next, a hardware configuration of the management apparatus according to the first embodiment will be described with reference to FIG. 7. The management apparatus according to the first embodiment is configured to include a computer 100. The computer 100 includes a server, a client, a microcomputer, a general-purpose computer and other equivalent computers.

Figure 7:
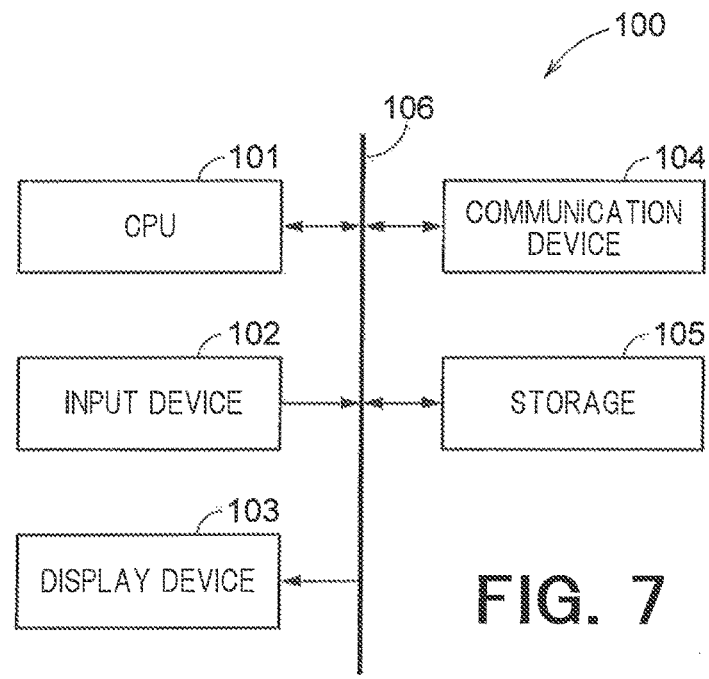
FIG. 7 is a diagram illustrating one example of a hardware configuration of the aggregation management apparatus according to the first embodiment.

FIG. 7 is a diagram illustrating one example of the computer 100. As illustrated in FIG. 7, the computer 100 includes a central processing unit (CPU) 101, an input device 102, a display device 103, a communication device 104, and a storage 105. The CPU 101, the input device 102, the display device 103, the communication device 104 and the storage 105 are interconnected via a bus 106.

The CPU 101 is processing circuitry or an electronic circuit, including a controller and an arithmetic device of the computer 100. The CPU 101 executes an arithmetic process based on data inputted from the respective devices (e.g., the input device 102, the communication device 104 and the storage 105) interconnected via the bus 106 and a program, and outputs an arithmetic result and a control signal to the individual devices (e.g., the display device 103, the communication device 104 and the storage 105) interconnected via the bus 106. To be specific, the CPU 101 runs an operating system (OS) of the computer 100 and an aggregation management program, thereby controlling the respective devices configuring the computer 100.

The aggregation management program (which will hereinafter be simply termed the "management program") is a program run by the computer 100 to attain the respective functional configurations described above. The management program is stored on a non-transitory tangible computer readable storage medium. The storage medium is exemplified by an optical disk, a magneto-optical disk, a magnetic disk, a magnetic tape, a flash memory and a semiconductor memory. However, the storage medium is not limited to these examples. The CPU 101 runs the management program, whereby the computer 100 functions as the management apparatus.

The input device 102 is a device for inputting the information to the computer 100. The input device 102 is exemplified by a keyboard, a mouse and a touch panel. However, the input device 102 is not limited to these examples.

The display device 103 is a device for displaying images and videos. The display device 103 is exemplified by, a liquid crystal display (LCD), a cathode ray tube (CRT) and a plasma display panel (PDP). However, the display device 103 is not limited to these examples.

The communication device 104 is a device for the computer 100 to perform wireless or wired communications with external devices. The communication device 104 is exemplified by a modem, a hub and a router. However, the communication device 104 is not limited to these examples. The information such as the facility information, the registration request, the correlation level, the solar radiation information, the solar radiation error and the selling price information may be inputted from the external devices via the communication device 104. The assessed buying price may be presented by transmitting this buying price to a computer of the new PV producer via the communication device 104.

The storage 105 is a storage medium to store the OS of the computer 100, the management program, data required for running the management program, and data generated by running the management program. The storage 105 includes a main storage and an external storage. The main storage is exemplified by a random access memory (RAM), a dynamic RAM (DRAM) and a static RAM (SRAM). However, the main storage is not limited to these examples. The external storage is exemplified by a hard disk, an optical disc, a flash memory and a magnetic tape. However, the external storage is not limited to these examples. The facility information DB 2, the correlation level DB 3, the solar radiation information DB 5, the solar radiation error DB 7 and the selling price information DB 9 may be built up on the storage 105, and may also be built up on an external server.

Note that the computer 100 may include each one of or pluralities of the CPUs 101, the input devices 102, the display devices 103, the communication devices 104 and the storages 105, and may receive connections of peripheral equipments such as a printer and a scanner.

The management apparatus may be configured to include the single computer 100, and may also configured as a system including a plurality of Interconnected computers 100.

The management program may be stored in the storage 105 of the computer 100, may also be stored in an external storage medium of the computer 100, and may further be uploaded on the Internet. In any case, the management program is installed into and runs on the computer 100, thereby attaining the functions of the management apparatus.

Figure 8:
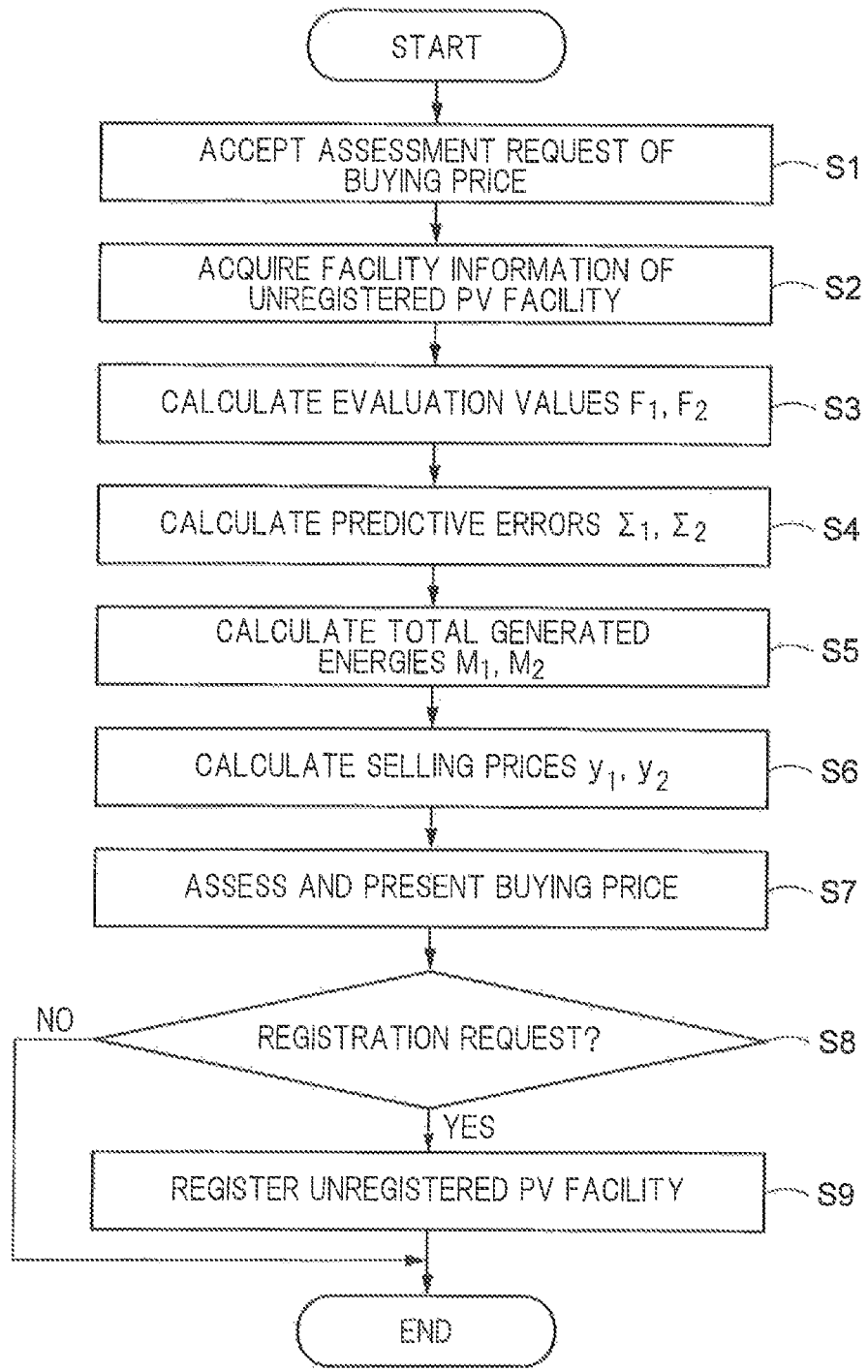
FIG. 8 is a flowchart illustrating one example of an operation of the aggregation management apparatus according to the first embodiment.

Next, an operation of the management apparatus according to the first embodiment will be described with reference to FIG. 8. FIG. 8 is a flowchart illustrating one example of the operation of the management apparatus. The following discussion will describe an operation in such a case that the new PV producer makes a request for assessing the buying price.

When the new PV producer makes the request for assessing the buying price, as illustrated in FIG. 8, at first, the assessment accepting unit 1 receives the assessment request (step S1). The assessment accepting unit 1 receiving the assessment request acquires the facility information (the position information L and the performance information p) of the unregistered PV facility on which the buying price assessment request is requested (step S2). This PV facility becomes the target PV facility. The assessment accepting unit 1 may request the new PV producer for the facility information, and the new PV producer may input the facility information together with the assessment request. The assessment accepting unit 1 provides the acquired facility information of the unregistered PV facility to the predictive error evaluation unit 4 and the total generated energy calculation unit 6.

The predictive error evaluation unit 4 receiving the facility information of the unregistered PV facility acquires the facility information (the position information L and the performance information p) of each registered PV facility from the facility information DB 2, and further acquires the correlation level C(r) from the correlation level DB 3. The predictive error evaluation unit 4 calculates the performance information $P_1$ and the evaluation value $F_1$ of the new PV facility, based on the facility information of the unregistered PV facility and the registered PV facility and the correlation level C(r). The predictive error evaluation unit 4 further calculates the performance information $P_2$ and the evaluation value $F_2$ of the current PV facility, based on the facility information of the registered PV facility and the correlation level C(r) (step S3). The evaluation values $F_1$, $F_2$ are calculated by, e.g., the formulae (3)-(5). The predictive error evaluation unit 4 provides the evaluation values $F_1$, $F_2$ and the pieces of performance information $P_1$, $P_2$ to the predictive error calculation unit 8, and further provides the performance information $P_1$, $P_2$ to the total generated energy calculation unit 6.

The predictive error calculation unit 8 receiving the evaluation values $F_1$, $F_2$ and the performance information $P_1$, $P_2$ acquires the solar radiation error $\sigma$ from the solar radiation error DB 7. The predictive error calculation unit 8 calculates the predictive error $\Sigma_1$, based on the evaluation value $F_1$ of the set of new PV facilities and the solar radiation error $\sigma$. The predictive error calculation unit 8 further calculates the predictive error $\Sigma_2$, based on the evaluation value $F_2$ of the set of current PV facilities and the solar radiation error $\sigma$ (step S4). The predictive errors $\Sigma_1$, $\Sigma_2$ are calculated by, e.g., the formula (7). The predictive error calculation unit 8 provides the calculated predictive errors $\Sigma_1$, $\Sigma_2$ to the selling price calculation unit 10.

On the other hand, the total generated energy calculation unit 6 receiving the performance information $P_1$, $P_2$ acquires the solar radiation information $\mu$ from the solar radiation information DB 5. The total generated energy calculation unit 6 calculates the total generated energy $M_1$ of the set of new PV facilities, based on the performance information $P_1$ of the set of new PV facilities and the solar radiation information $\mu$. The total generated energy calculation unit 6 also calculates the total generated energy $M_2$ of the set of current PV facilities, based on the performance information $P_2$ of the set of current PV facilities and the solar radiation information $\mu$ (step S5). The total generated energies $M_1$, $M_2$ are calculated by, e.g., the formula (6). The total generated energy calculation unit 6 provides the calculated total generated energy $M_1$, $M_2$ to the selling price calculation unit 10. Note that the calculation of the predictive error $\Sigma$ (step S4) and the calculation of the total generated energy M (step S5) may be reversed in sequential order.

Next, the selling price calculation unit 10 receiving the predictive errors $\Sigma_1$, $\Sigma_2$ and the total generated energies $M_1$, $M_2$ acquires the selling price information from the selling price information DB 9. The selling price calculation unit 10 calculates a selling price $y_1$ of the set of new PV facilities, based on the predictive error $\Sigma_1$ and the total generated energy $M_1$ of the set of new PV facilities and the selling price information. The selling price calculation unit 10 calculates a selling price $y_2$ of the set of current PV facilities, based on the predictive error $\Sigma_2$ and the total generated energy $M_2$ of the set of current PV facilities and the selling price information (step S6). The selling price y is calculated by, e.g., the formula (8). The selling price calculation unit 10 provides the calculated selling prices $y_1$, $y_2$ to the selling price assessing unit 11.

The selling price assessing unit 11 receiving the selling prices $y_1$, $y_2$ assesses the buying price of the power from the unregistered PV facility on the basis of the selling prices $y_1$, $y_2$. The selling price assessing unit 11 assesses the buying price higher than a reference buying price when the selling price $y_1$ is higher than the buying price $y_2$, and assesses the buying price lower than the reference buying price when the selling price $y_1$ is lower than the buying price $y_2$. The selling price assessing unit 11 presents the assessed buying price to the new PV producer (step S7).

Thereafter, the new PV producer determines whether to sell the power to the aggregator by reference to the presented buying price. When the new PV producer determines not to sell the power, the processing finishes hereat without inputting the registration request (NO in step S8). Whereas when the new PV producer determines to sell the power, the new PV producer inputs the registration request to the management apparatus (YES in step S8).

The registration unit 12, upon accepting the registration request, acquires the facility information of the unregistered PV facility requested for the registration. The registration unit 12 may request the new PV producer for the facility information, and the new PV producer may also input the facility information together with the registration request. The registration unit 12 stores the acquired facility information of the unregistered PV facility in the facility information DB 2. The PV facility of the new PV producer is thereby registered as the aggregated target PV facility (step S9).

As described above, the management apparatus according to the first embodiment can calculate the evaluation value F for evaluating the predictive error $\Sigma$ of the total generated energy M of the set of PV facilities. The aggregator refers to the evaluation value F and is thereby enabled to easily grasp a degree of the predictive error of the set of current facilities and a variation of the predictive error in the case of adding the new PV facility to the set of current PV facilities. It is therefore feasible to improve the profitability of the aggregation business by building up the set of PV facilities with the small predictive error.

The management apparatus according to the first embodiment can present, to the new PV producer, the buying price corresponding to the evaluation value F (i.e., the easiness to predict the total generated energy M) of the set of new PV facilities.

When the prediction on the total generated energy $M_1$ of the set of new PV facilities is easier than the total generated energy $M_2$ of the set of current PV facilities ($y_1 > y_2$), the buying price presented to the new PV producer is assessed high. An incentive to the new PV producer having the PV facility is thereby generated and can prompt the new PV producer to register the PV facility. Accordingly, the prediction of the total generated energy M of the set of PV facilities can be facilitated.

Whereas when the prediction on the total generated energy $M_1$ of the set of new PV facilities is more difficult than the total generated energy $M_2$ of the set of current PV facilities ($y_1 < y_2$), the buying price presented to the new PV producer is assessed low. Under this condition, when the new PV producer having the PV facility registers the PV facility, the aggregator can purchase the power at the low buying price, though the prediction on the total generated energy M of the set of PV facilities is difficult.

Thus, the management apparatus is capable of increasing the profitability of the aggregation business by improving accuracy of predicting the total generated energy M of the set of PV facilities and decreasing the buying price.

Second Embodiment

Figure 9:
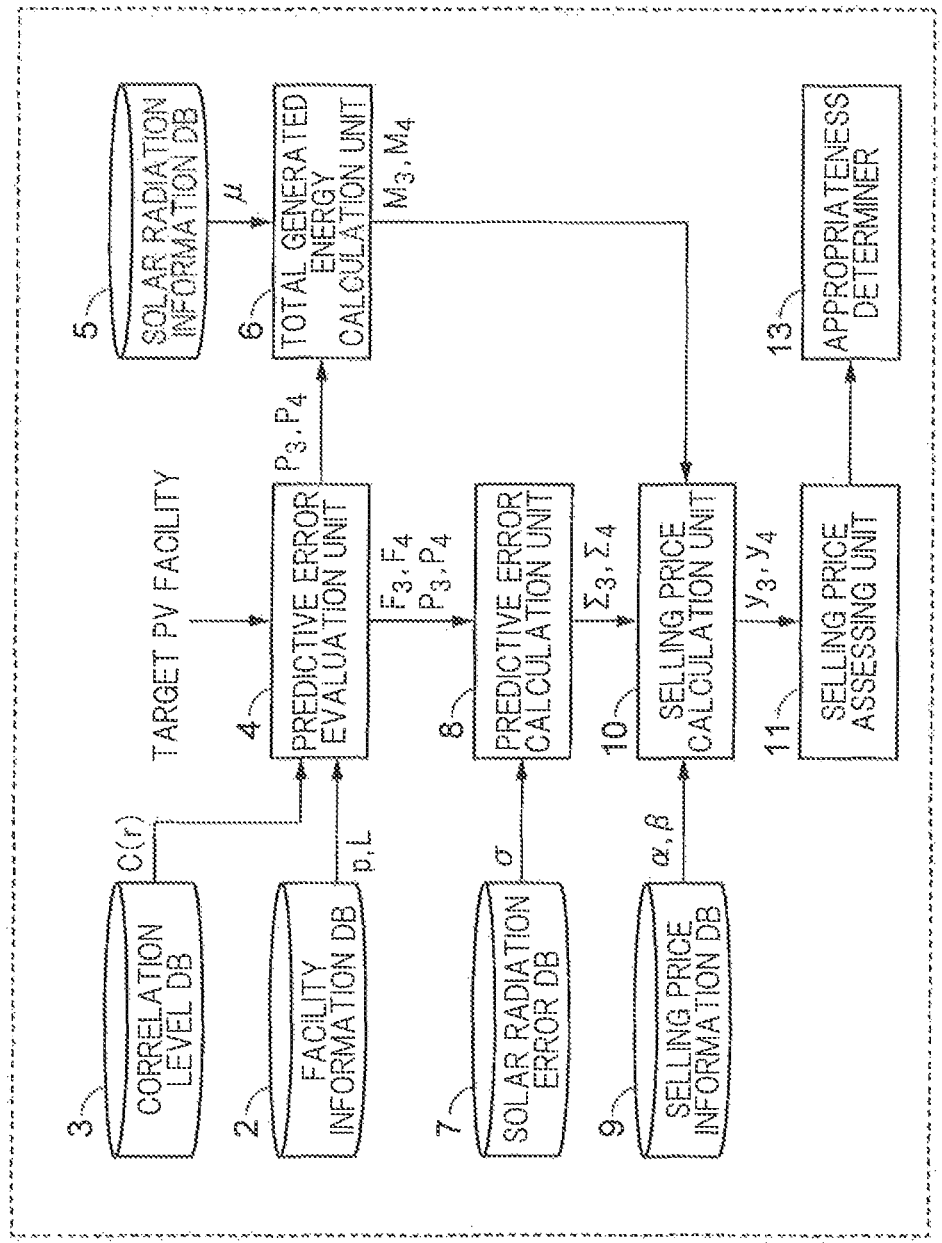
FIG. 9 is a diagram illustrating one example of a functional configuration of the aggregation management apparatus according to a second embodiment.

The management apparatus according to a second embodiment will be described with reference to FIG. 9. The first embodiment has described the case of assessing the buying price applied for the unregistered PV facility. By contrast, the second embodiment will describe a case of assessing the buying price applied for the registered PV facility.

As stated above, the set of PV facilities is updated sequentially by registering the new PV facility. When the set of PV facilities is updated, the buying price for the registered PV producer, which has been appropriate so far, is considered inappropriate. For example, when the predictive error f of the set of PV facilities decreases due to the registration of the remote PV facility, the buying price for the registered PV producer registered previously is considered relatively high. Such a buying price results in a risk of decreasing the profitability of the aggregation business.

Such being the case, the second embodiment will describe the management apparatus that reassesses the buying price for the registered PV producer. FIG. 9 is a diagram illustrating one example of a functional configuration of the management apparatus according to the second embodiment. As illustrated in FIG. 9, the management apparatus according to the second embodiment includes an appropriateness determiner 13 but does not include the assessment accepting unit 1 and the registration unit 12. Other components are the same as those in the first embodiment.

Note that the management apparatus according to the second embodiment has the same hardware configuration as that of the first embodiment. The management apparatus may also take the configuration including the assessment accepting unit 1 and the registration unit 12. The following description will be focused on different points from the first embodiment.

In the second embodiment, the target PV facility is selected from the plurality of registered PV facilities. The target PV facility in the second embodiment is the PV facility on which the buying price is reassessed. The target PV facility may be selected by a user of the management apparatus via the input device 102, and may also be selected by the management apparatus in accordance with an arbitrary algorithm.

In the second embodiment, the predictive error evaluation unit 4 calculates an evaluation value $F_3$ (a first evaluation value) and an evaluation value $F_4$ (a second evaluation value).

The evaluation value $F_3$ is an evaluation value of the set of current PV facilities. Similarly to the first embodiment, the set of current PV facilities is a set of PV facilities including the registered PV facility. In other words, the set of current PV facilities includes the target PV facility. The predictive error evaluation unit 4 calculates performance information $P_3$ of the set of current PV facilities and a weighting coefficient $w_3$ on the basis of the performance information p of the registered PV facility. The predictive error evaluation unit 4 calculates the evaluation value $F_3$, based on the calculated performance information $P_3$, the calculated weighting coefficient $w_3$, the position information L of the registered PV facility, and the correlation level C(r) stored in the correlation level DB 3. The evaluation value $F_3$ corresponds to the evaluation value $F_1$ in the first embodiment.

An evaluation value $F_4$ is an evaluation value of the set of PV facilities for the reassessment. The set of PV facilities for the reassessment is a set of PV facilities including the PV facilities exclusive of the target PV facility in the registered PV facilities but not including the target PV facility. In other words, the set of PV facilities for the reassessment corresponds to the set of PV facilities excluding the target PV facility from the set of current PV facilities. The predictive error evaluation unit 4 calculates performance information $P_4$ of the set of PV facilities for the evaluation and a weighting coefficient $w_4$, based on the performance information p of the registered PV facility. The predictive error evaluation unit 4 calculates the evaluation value $F_4$, based on the calculated performance information $P_4$, the calculated weighting coefficient $w_4$, the position information L of the registered PV facility, and the correlation level C(r) stored in the correlation level DB 3. The evaluation value $F_4$ corresponds to the evaluation value $F_2$ in the first embodiment.

In the second embodiment, the total generated energy calculation unit 6 calculates a total generated energy $M_3$ (a first total generated energy) and a total generated energy $M_4$ (a second total generated energy).

The total generated energy $M_3$ is a total generated energy of the set of current PV facilities. The total generated energy calculation unit 6 calculates the total generated energy $M_3$, based on the performance information $P_3$ of the set of current PV facilities and the solar radiation information µ stored in the solar radiation information DB 5. The total generated energy $M_3$ corresponds to the total generated energy $M_1$ in the first embodiment.

The total generated energy $M_4$ is a total generated energy of the set of PV facilities for the reassessment. The total generated energy calculation unit 6 calculates the total generated energy $M_4$, based on the performance information $P_4$ of the set of PV facilities for the reassessment, the solar radiation information µ stored in the solar radiation information DB 5. The total generated energy $M_4$ corresponds to the total generated energy $M_2$ in the first embodiment.

In the second embodiment, the predictive error calculation unit 8 calculates a predictive error $\Sigma_3$ (a first predictive error) and a predictive error $\Sigma_4$ (a second predictive error).

The predictive error $\Sigma_3$ is a predictive error of the set of current PV facilities. The predictive error calculation unit 8 calculates the predictive error $\Sigma_3$, based on the evaluation value $F_3$, the performance information $P_3$ of the set of PV facilities, and the solar radiation σ of the area covering at least part of the set of PV facilities. The predictive error $\Sigma_3$ corresponds to the predictive error $\Sigma_1$ in the first embodiment.

The predictive error $r_4$ is a predictive error of the set of PV facilities for the reassessment. The predictive error calculation unit 8 calculates the predictive error $\Sigma_4$, based on the evaluation value $F_4$, the performance information $P_4$ of the set of PV facilities, and the solar radiation σ of the area covering at least part of the set of PV facilities. The predictive error $\Sigma_4$ corresponds to the predictive error $\Sigma_2$ in the first embodiment.

In the second embodiment, the selling price calculation unit 10 calculates a selling price $y_3$ (a first selling price) and a selling price $y_4$ (a second selling price).

The selling price $y_3$ is a selling price for the set of current PV facilities. The selling price calculation unit 10 calculates the selling price $y_3$ on the basis of the predictive error $\Sigma_3$, the total generated energy $M_3$ and the selling price information α, β. The selling price $y_3$ corresponds to the selling price $y_1$ in the first embodiment.

The selling price $y_4$ is a selling price for the set of PV facilities for the reassessment. The selling price calculation unit 10 calculates the selling price $y_4$ on the basis of the predictive error $\Sigma_4$, the total generated energy $M_4$ and the selling price information α, β. The selling price $y_4$ corresponds to the selling price $y_2$ in the first embodiment.

The buying price assessing unit 11 reassesses the buying price (⌈/kWh) on the occasion of purchasing the power from the target PV facility on the basis of the selling prices $y_3$, $y_4$ calculated by the selling price calculation unit 10. The selling price $y_3$ corresponds to a selling price for the set of PV facilities including the target PV facility. The selling price $y_4$ corresponds to a selling price for the set of PV facilities not including the target PV facility.

Hence, the selling price $y_3$ being higher (lower) than the selling price $y_4$ implies that the selling price increases (decreases) by purchasing the power from the target PV facility. The increase (decrease) in selling price corresponds to an increase (decrease) in profitability of the aggregator.

Such being the case, the selling price assessing unit 11 assesses the buying price that the buying price applied when when the selling price $y_3$ is higher than the selling price $y_4$ is higher that the buying price applied when the selling price $y_3$ is lower than the selling price $y_4$. As this assessment method, there is considered a method of, e.g., setting a reference buying price, then assessing the buying price of the target PV facility higher than the reference buying price when the selling price $y_3$ is higher than the selling price $y_4$, and assessing the buying price of the target PV facility lower than the reference buying price when the selling price $y_3$ is lower than the selling price $y_4$. A degree of how much the buying price is set high (or low) may be determined corresponding to a difference between the selling price $y_3$ and the selling price $y_4$.

The appropriateness determiner 13 compares the buying price, reassessed by the buying price assessing unit 11, of the target PV facility with an actual buying price of the target PV facility, and determines the appropriateness of the buying price for the target PV facility. For example, the appropriateness determiner 13 determines the buying price to be appropriate when the reassessed buying price is within a predetermined range of the actual buying price. The appropriateness determiner 13 determines the buying price to be excessively high (inappropriate) when lower than the predetermined range, but to be excessively low (inappropriate) when higher than the predetermined range.

The management apparatus according to the second embodiment reassesses the buying price described above periodically or at predetermined timing. The predetermined timing is exemplified by the timing when the user of the management apparatus makes a request for the reassessment or the timing when the new PV facility is registered in the set of PV facilities.

As described above, the management apparatus according to the second embodiment reassesses the buying price for the registered PV producer, makes the determination about the appropriateness of the buying price and thereby can grasp whether the buying price for the PV producer is inappropriate. The aggregator is thereby enabled to ask the PV producer to reduce the buying price in case that the buying price is excessively high, or to propose an increased buying price to the PV producer in case that the buying price is excessively low.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An aggregation management apparatus for evaluating a prediction error of a total generated energy of a set of photovoltaic power generation facilities in a target area, comprising:
    hardware storage configured to:
        store position information and performance information of each photovoltaic power generation facility in a set of photovoltaic power generation facilities and information of correspondence between a distance of two locations and a correlation level of predictive errors of solar radiation information for the two locations, each of the predictive errors of solar radiation information being a difference between an observed value of solar radiation information and a predicted value of solar radiation information and processing circuitry configured to:
    acquire the position information and the performance information of each photovoltaic power generation facility and the correspondence information from the storage;
    specify distances between the respective photovoltaic power generation facilities based on the position information and calculate the correlation levels between the respective photovoltaic power generation facilities, based on the distances between the respective photovoltaic power generation facilities and the correspondence information; and
    calculate an evaluation value for evaluating a predictive error of a total generated energy of the set of photovoltaic power generation facilities, based on the calculated correlation levels and the performance information, the predictive error of a total generated energy being a difference between a total of predicted generated energy of the set of photovoltaic power generation facilities and a total of actually supplied generated energy of the set of photovoltaic power generation facilities.

2. The apparatus according to claim 1, wherein
the evaluation value is a standard deviation of correlation levels between the respective photovoltaic power generation facilities;
an average of correlation levels between the respective photovoltaic power generation facilities, or
a variance of correlation levels between the respective photovoltaic power generation facilities.

3. The apparatus according to claim 1, wherein
the performance information contains a system output coefficient of the photovoltaic power generation facility.

4. The apparatus according to claim 1, wherein
the correlation level becomes smaller as the distance becomes long.

5. The apparatus according to claim 1, wherein
the processing circuitry is configured to calculate the predictive error of the total generated energy, based on the evaluation value, the performance information, and the predictive error of the solar radiation information of an area covering at least part of the set of photovoltaic power generation facilities.

6. The apparatus according to claim 1, wherein
the processing circuitry is configured to calculate the total generated energy, based on the performance information and the solar radiation information of the area covering at least part of the set of photovoltaic power generation facilities.

7. The apparatus according to claim 1, wherein
the processing circuitry is configured to calculate a selling price of electric power, based on the total generated energy, the predictive error of the total generated energy and selling price information.

8. The apparatus according to claim 1, wherein
the processing circuitry is configured to assess a buying price on the electric power from a target photovoltaic power generation facility, based on a first selling price applied for the target photovoltaic power generation facility in case of being included in the set of photovoltaic power generation facilities and a second selling price applied for the target photovoltaic power generation facility in case of not being included in the set of photovoltaic power generation facilities.

9. The apparatus according to claim 8, wherein
the processing circuitry is configured to assess the buying price such that a buying price applied when the first selling price is higher than the second selling price is higher that a buying price applied when the first selling price is lower that the second selling price.

10. The apparatus according to claim 8, wherein
the processing circuitry is configured to present the assessed buying price to a power generation producer having the target photovoltaic power generation facility.

11. The apparatus according to claim 1, wherein
the processing circuitry is configured to calculate a first evaluation value under a condition that the target photovoltaic power generation facility is included in the set of photovoltaic power generation facilities, and a second evaluation value under a condition that the target photovoltaic power generation facility is not included in the set of photovoltaic power generation facilities.

12. The apparatus according to claim 5, wherein
the processing circuitry is configured to calculate a first predictive error under a condition that the target photovoltaic power generation facility is included in the set of photovoltaic power generation facilities, and a second predictive error under a condition that the target photovoltaic power generation facility is not included in the set of photovoltaic power generation facilities.

13. The apparatus according to claim 6, wherein
the processing circuitry is configured to calculate a first total generated energy under a condition that the target photovoltaic power generation facility is included in the set of photovoltaic power generation facilities, and a second total generated energy under a condition that the target photovoltaic power generation facility is not included in the set of photovoltaic power generation facilities.

14. The apparatus according to claim 7, wherein
the processing circuitry is configured to calculates a first selling price under a condition that the target photovoltaic power generation facility is included in the set of photovoltaic power generation facilities, and a second selling price under a condition that the target photovoltaic power generation facility is not included in the set of photovoltaic power generation facilities.

15. The apparatus according to claim 1, wherein
the processing circuitry is configured to register an unregistered photovoltaic power generation facility as an aggregated target facility according to a request from a power generation producer having the unregistered photovoltaic power generation facility.

16. The apparatus according to claim 8, wherein
the target photovoltaic power generation facility is an unregistered photovoltaic power generation facility as an aggregated target facility.

17. The apparatus according to claim 8, wherein
the target photovoltaic power generation facility is a registered photovoltaic power generation facility.

18. An aggregation management method for evaluating a prediction error of a total generated energy of a set of photovoltaic power generation facilities in a target area comprising:
providing position information and performance information of each photovoltaic power generation facility in a set of photovoltaic power generation facilities;
providing information of correspondence between a distance of two locations and a correlation level of predictive errors of solar radiation information for the two locations, each of the predictive errors of solar radiation information being a difference between an observed value of solar radiation information and a predicted value of solar radiation information;
specifying distances between the respective photovoltaic power generation facilities based on the position information;
calculating correlation levels between the respective photovoltaic power generation facilities, based on the distances between the respective photovoltaic power generation facilities and the correspondence information; and
calculating an evaluation value for evaluating a predictive error of a total generated energy of the set of photovoltaic power generation facilities, based on the calculated correlation levels and the performance information, the predictive error of a total generated energy being a difference between a total of predicted generated energy of the set of photovoltaic power generation facilities and a total of actually supplied generated energy of the set of photovoltaic power generation facilities.

* * * * *